US008985599B2

(12) United States Patent
Peterson

(10) Patent No.: US 8,985,599 B2
(45) Date of Patent: Mar. 24, 2015

(54) METHOD AND APPARATUS FOR ASSISTING USERS OF CONVENTIONAL STAND ALONE WALKERS

(71) Applicant: Jacqulyn Peterson, Marengo, IA (US)

(72) Inventor: Jacqulyn Peterson, Marengo, IA (US)

( * ) Notice: Subject to any disclaimer, the term of this patent is extended or adjusted under 35 U.S.C. 154(b) by 0 days.

(21) Appl. No.: 14/190,549

(22) Filed: Feb. 26, 2014

(65) Prior Publication Data

US 2014/0175766 A1 Jun. 26, 2014

Related U.S. Application Data

(63) Continuation of application No. 13/456,902, filed on Apr. 26, 2012, now Pat. No. 8,708,355.

(60) Provisional application No. 61/480,067, filed on Apr. 28, 2011.

(51) Int. Cl.

| | |
|---|---|
| ***B62B 11/00*** | (2006.01) |
| ***A61H 3/04*** | (2006.01) |
| *A61G 5/00* | (2006.01) |
| *A61G 5/14* | (2006.01) |

(52) U.S. Cl.

CPC .. *A61H 3/04* (2013.01); *A61G 5/00* (2013.01); *A61G 5/14* (2013.01); *A61H 2201/0173* (2013.01); *A61H 2201/1633* (2013.01)

USPC .......................................................... 280/47.35

(58) Field of Classification Search

USPC ............... 280/47.24, 47.25, 242.1, 30, 87.05, 280/649–650, 639, 647–648, 200, 304.1

See application file for complete search history.

(56) References Cited

U.S. PATENT DOCUMENTS

| | | | | |
|---|---|---|---|---|
| 3,398,974 | A | 8/1968 | Edwards et al. | |
| 4,345,790 | A | 8/1982 | Coe | |
| 4,861,051 | A | 8/1989 | Napper | |
| 4,974,620 | A | 12/1990 | Quillan et al. | |
| 5,058,912 | A | 10/1991 | Harroun | |
| 5,277,438 | A | 1/1994 | Chuange | |
| 5,366,231 | A * | 11/1994 | Hung | 280/87.051 |
| 5,380,262 | A | 1/1995 | Austin | |
| 5,499,856 | A | 3/1996 | Sorrell et al. | |
| 5,741,020 | A | 4/1998 | Harroun | |
| 6,311,708 | B1 | 11/2001 | Howle | |
| 7,669,863 | B2 | 3/2010 | Steiner et al. | |
| 2002/0084617 | A1 * | 7/2002 | Torsiello | 280/250.1 |
| 2011/0187067 | A1 | 8/2011 | Staggs | |

* cited by examiner

*Primary Examiner* — John Walters
*Assistant Examiner* — James Triggs
(74) *Attorney, Agent, or Firm* — Simmons Perrine Moyer Bergman PLC

(57) ABSTRACT

A system of attaching a trailing seat attachment to a walker so a person can sit down while using the walker without the need to turn around. The system comprising a pair of facing identical wheeled walkers coupled by an extension rod there between, where the walker includes spring loaded casters to restrict rolling when downward forces are applied to the walker seat or grips.

17 Claims, 1 Drawing Sheet

METHOD AND APPARATUS FOR ASSISTING USERS OF CONVENTIONAL STAND ALONE WALKERS

FIELD OF THE INVENTION

The present invention relates to assisting users of walkers with a safe and convenient place to sit while using a conventional stand-alone walker and more specifically to providing trailing chair attachments for operation with various makes and models of pre-existing walkers.

BACKGROUND OF THE INVENTION

In the past, it has not been uncommon in a nursing home environment to have many patients/residents each having their own personally owned conventional stand alone walker. The term "conventional stand alone walker" is hereby defined to be a walker apparatus for aiding a person walking, which includes at least three upwardly extending support members, which provide support to structures for two hands of a person to grasp while walking; and further having at least three points (either rolling, non-rolling, or a combination of the two) of contacting the ground. The term conventional stand alone walker shall specifically exclude a walker device which has a structure thereon which is specifically adapted to be coupled with a structure for pulling a rolling chair.

At times, such as after surgery or other incident, residents may need to exercise by walking with a conventional stand alone walker. At times, these patients may temporarily require additional assistance. In such cases, many staff members can be needed in assisting users of conventional stand alone walkers. In many instances, two staff members are used simultaneously to aid a single user of a conventional stand alone walker. In such situations where the patient is using such a walker, one staff person is walking next to the patient and another follows with a wheel chair. In the event the patient begins to tire or fall, the person walking with the patient provides immediate support, while the other guides the wheel chair into place so the patient can be seated.

In the past, it has been known to combine a walker and seat. U.S. Pat. No. 4,974,620 is directed to a walker with a seat which permits the person using the walker to take a rest by being seated in an opposite facing seat. Another patent describes a walker with an attached seat which allows the user to take a forward facing seat when desired. See U.S. Pat. No. 5,058,912.

U.S. Pat. No. 5,277,438 describes a collapsible rolling apparatus with a seat and a walking support structure.

While these devices do provide significant utility, they do have drawbacks.

The '620 patent requires the walker to turn around to sit down. In some situations turning around may be difficult, especially if the patient is very unstable or needs to sit urgently.

With the '912 patent, the seat is facing the direction of travel but the system, with only wheels contacting the ground, may not provide the same level of exercise as is required of a person using a conventional stand alone walker, nor does it provide the same level of stability as a conventional stand alone walker. This system, with its ability to roll in any direction, could be difficult for some individuals to use as a walker and entering/exiting it may also be difficult for some.

Lastly, the '438 patent is a large structure, also with only wheels touching the ground, and the structure includes two collapsing segments which are not designed to work independently of the other. The '438 patent does not take advantage of the installed base of walkers, and can not provide the same familiarity as the person's own walker.

Consequently, there exists a need for improvements in using conventional stand alone walkers which overcomes some of the problems of these prior designs.

SUMMARY OF THE INVENTION

It is an object of the present invention to provide an efficient and safe method for assisting a large group of users of their own personal conventional stand alone walkers.

It is a feature of the invention to utilize an installed base of pre-existing conventional stand alone walkers from various manufacturers.

It is another feature of the invention to provide a quick connecting and disconnection method for coupling a trailing chair attachment to a patient's own pre-existing conventional stand alone walker.

It is an advantage of the present invention to reduce the expense of providing assistance to a large number of users of conventional stand alone walkers with minimal investment in equipment, while at the same time allowing the patient to enjoy the comfort and peace of mind of using their own familiar personal conventional stand alone walker.

Accordingly, the present invention comprises a trailing chair attachment which works with a conventional stand alone walker from various manufacturers, without a need to make changes to the patient's own walker.

DETAILED DESCRIPTION

Figure 1:
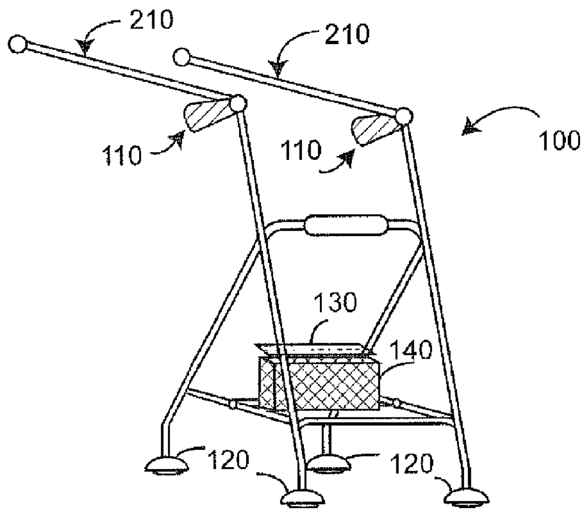
FIG. 1 is an assembly of the present invention.
Figure 3:
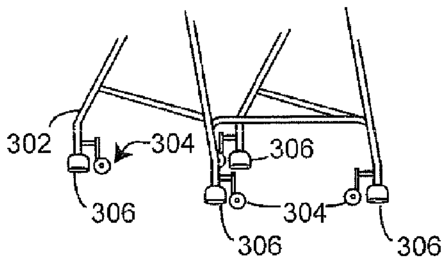
FIG. 3 is a roll restricting assembly of the present invention.

Now referring to FIG. 1, there is shown a device, generally designated 100, of the present invention, which could be as simple as a well known and very popular prior art wheeled walker except that it is equipped with connection arms 210 and spring loaded casters 120, which restrict rolling when a downward force is applied thereon. These spring loaded castors may have adjustable tension for different weights of persons using the walkers. Such spring loaded casters are well known for use with rolling step ladders which roll freely when moved without a load and then lock down, with an internal to the castor brake, when a person steps on the ladder. In some instances, the casters 120 could, instead, be spring loaded wheels 304. Now referring to FIG. 3, there is shown an alternate embodiment of the present invention which has standard walker legs 302 with firm gripping relatively soft pliable end caps 306, such as found on crutches and walkers. The wheels 304 can be spring loaded to allow them to move upward relative to the legs when increased forces are being applied to the length adjustable handles 110 (FIG. 1) or the seat 130. These wheels 304 and casters 120 allow the trailing chair attachment 100 to roll freely when there is minimal force applied to the handles 110 or the seat 130. Any suitable selective means for rolling could be used so long as the ability to roll is greatly reduced when pressure is increased on the walker. Spring loaded castors are just one method of allowing for weight sensitive rolling control to exist. For example, the castors 120 and 220 could be augmented with electric brakes which allow for the braking to occur in response to sensors detecting various things such as the amount of force the person walking applies to the handles 110. A combination of rolling control mechanisms could be employed as well.

Figure 2:
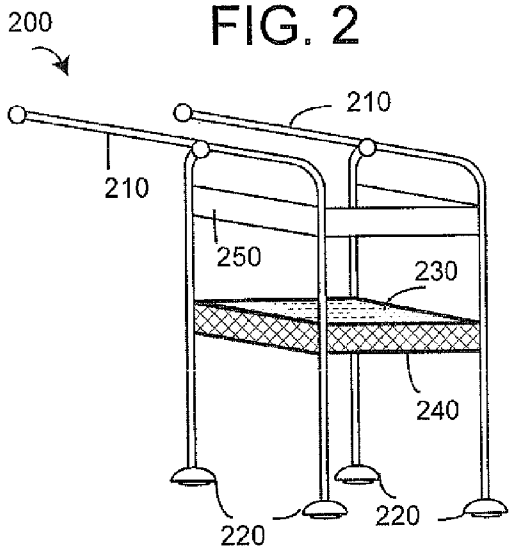
FIG. 2 is a dedicated trailing chair attachment of the present invention.

Now referring to FIG. 2, there is shown a dedicated trailing chair attachment of the present invention, generally designated 200 which also could have variable length connection bars 210 for connecting with the device 100 or any conventional stand alone walker. Snaps tethers or quick release connections 212 could be used to easily loosely couple the connection bars 210 between the seat portion 230 and the walker 100. The trailing chair attachment 200 can roll behind any walker on casters 220, similar to castors 120, as the person walking is located between the walker and the seat 230. The person using the walker can sit down at any time without the need to turn around. The length of connection bars can be adjusted for the size of the person, the speed of walking and other factors as well. Trailing chair attachment 200 may have a storage basket 240, similar to storage basket 140 beneath seat 130 of FIG. 1.

The main structural portions of the trailing chair attachment can be made of pipe, rods, straps, etc. and made of various materials such as steel, aluminum, plastic, wood or other suitable material. The walker can be constructed like many prior art walkers with suitable materials. It may be preferred, but is not essential, that the walker also have spring loaded casters. Some of the benefits of the present invention would still exist if the walker 100 had non-rolling tips, i.e. crutch tips, etc. The trailing chair attachment is readily detachable and can be removed to allow the use of the walker without a chair if a chair is not necessary.

In the method and system of the present invention, the device 100 could be used as both a walker, which the patient moves forward while walking and/or it could be used as a trailing chair attachment. In one embodiment of the present invention, they could be identical structures reversed in direction (i.e. the seats facing each other) and coupled to each other by connecting rods 210. The patient would be located between the two and could push one while the other trails along. When the patient is tired, the patient can merely sit down in the seat of the trailing chair attachment.

The Applicant believes that the present invention can be understood by a person skilled in the art after reading this application.

I claim:

1. A system for aiding persons who are walking comprising:

a rolling seat comprising:

a seat bottom configured for supporting a seated person;

at least two supports configured to support said seat bottom in an elevated position; and each of said supports having a rolling means coupled thereto;

which rolling means is configured to roll freely without a load and then be restricted, in all directions, in response to increased force being applied to said seat bottom; and a walker configured to be moved by said person while walking and said walker being coupled to said rolling seat.

2. The system of claim 1 wherein said walker is a conventional stand alone walker with handles to be grasped by a person while using said walker.

3. The system of claim 2 wherein said walker is detachably coupled to said rolling seat via a length adjustable elongated member.

4. The system of claim 1 wherein the walker is a rolling walker with a seat and with means thereon for restricting rolling capabilities of said rolling walker when weight upon said rolling walker is increased and wherein said walker is free of any feature thereon which has a primary function of assisting in coupling a trailing seat attachment thereto.

5. A method of aiding persons who are walking comprising the steps of:

providing a rolling seat which is configured to support a person;

said rolling seat, having a rolling means, which is configured with restricted rolling capabilities, in all directions, in response to increased forces being applied to said rolling seat;

a walker configured to be moved by a person while walking; and coupling said walker to said rolling seat with an elongated member, so that said rolling seat trails behind said walker when a patient utilizes said walker while moving it in a direction of travel.

6. The method of claim 5 wherein said step of coupling said walker is done so that said rolling seat trails behind the walker so that the walker can sit down at anytime, without turning around.

7. The method of claim 6 wherein said step of coupling said walker comprises the step of adjusting a length of an elongated member.

8. The method of claim 7 wherein said step of coupling is done in response to an a size or speed of a person using the walker.

9. The method of claim 8 wherein said walker is a conventional stand alone walker with hand grips configured to be grasped by a person using said walker.

10. The method of claim 9 wherein said conventional stand alone walker is a non-wheeled walker.

11. A system for aiding a person while walking comprising;

a walker;

a trailing seat attachment configured to support a seated person and configured to roll;

adjustable means for connecting said trailing seat attachment to said walker so that said trailing seat attachment trails behind the walker when the walker is moved by a person moving in a direction of travel; and where said trailing seat attachment comprises a means for restricting rolling, in all directions, of said trailing seat attachment in response to a person sitting in a seat of said trailing seat attachment.

12. The system of claim 11 wherein said walker and said trailing seat attachment are identical.

13. The system of claim 11 wherein said means for restricting is a spring loaded caster.

14. The system of claim 11 wherein said means for restricting is a spring loaded wheel in combination to a leg which engages the ground when said spring loaded wheel is retracted.

15. The system of claim 11 wherein said adjustable means for connecting is a means for quickly connecting said trailing seat attachment to said walker.

16. The system of claim 11 wherein said walker is a conventional stand alone walker.

17. The system of claim 16 wherein said conventional stand alone walker has legs which contact the ground during normal operation.

* * * * *